Feb. 23, 1932. S. BRODY 1,846,786
MEASURING FAUCET
Filed Aug. 21, 1931 2 Sheets-Sheet 1

Inventor
SAMUEL BRODY.
By Clarence A. O'Brien
Attorney

Feb. 23, 1932. S. BRODY 1,846,786
MEASURING FAUCET
Filed Aug. 21, 1931   2 Sheets-Sheet 2
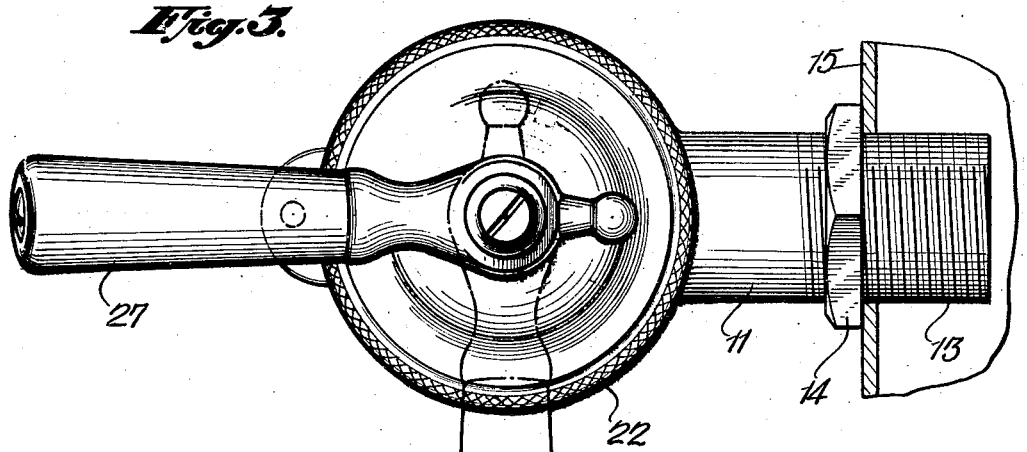
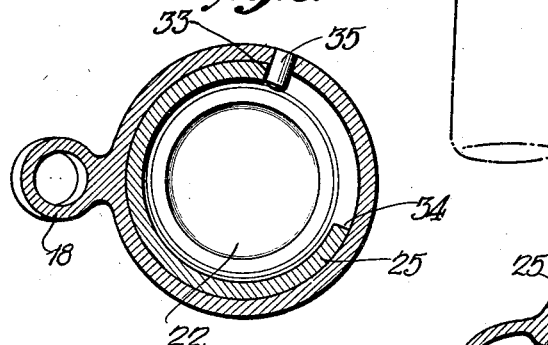
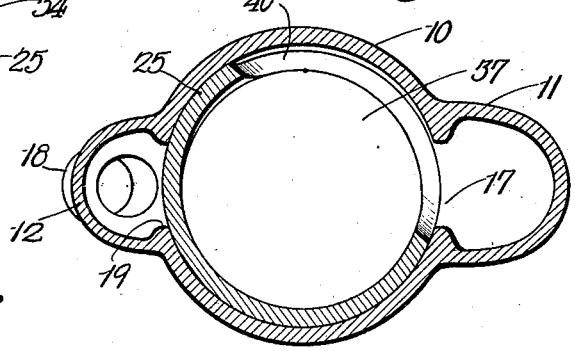
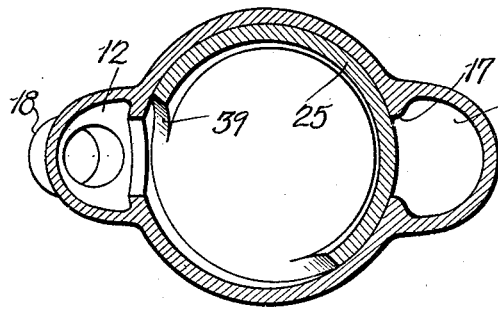
Inventor
SAMUEL BRODY
By Clarence A. O'Brien
Attorney Patented Feb. 23, 1932

1,846,786

UNITED STATES PATENT OFFICE

SAMUEL BRODY, OF NEW YORK, N. Y.

MEASURING FAUCET

Application filed August 21, 1931. Serial No. 558,617.

The present invention relates to new and useful improvements in measuring faucets, and while the device of the invention is capable of general use, it is particularly adapted for use in restaurants and the like for measuring cream in predetermined desired quantities.

It is one of the objects of the present invention to provide a measuring faucet which will be free and easy of operation, and which will deliver predetermined quantities of a fluid contained within a tank to which the faucet may be attached.

It is a further object of the invention to provide a device of the aforementioned character which will be simple in construction and operation.

A still further object of the invention relies in a new and novel construction whereby the quantity of fluid delivered by the measuring faucets may be varied without necessitating the replacement of any of the vital parts of the faucet as is the general practice.

Figure 1:
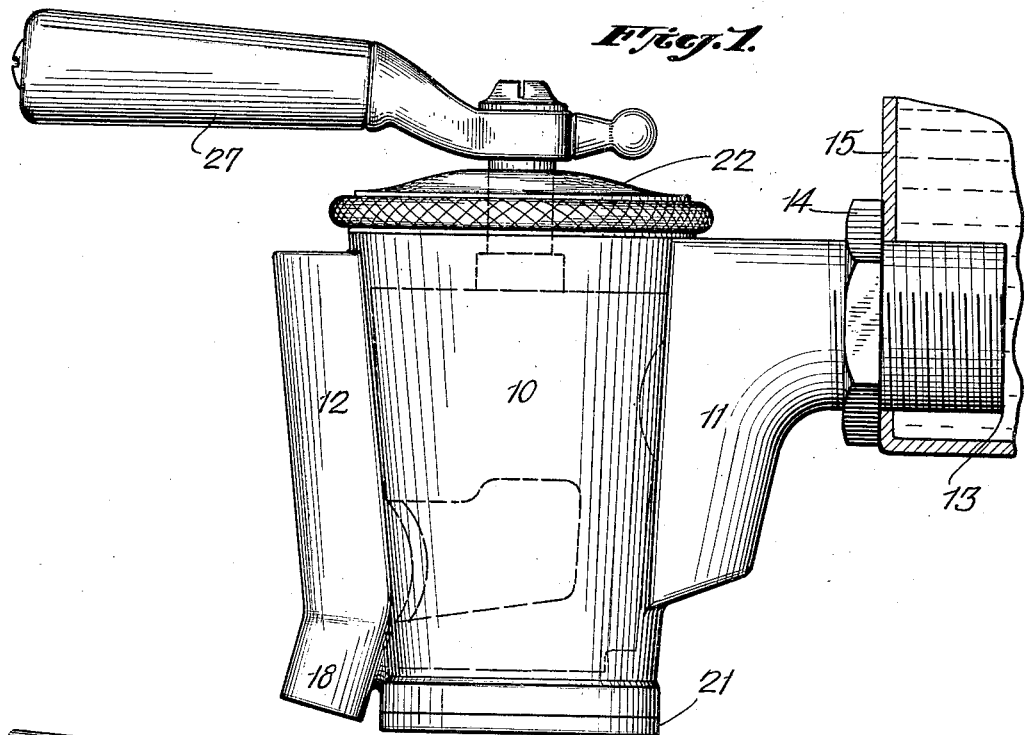
Figure 2:
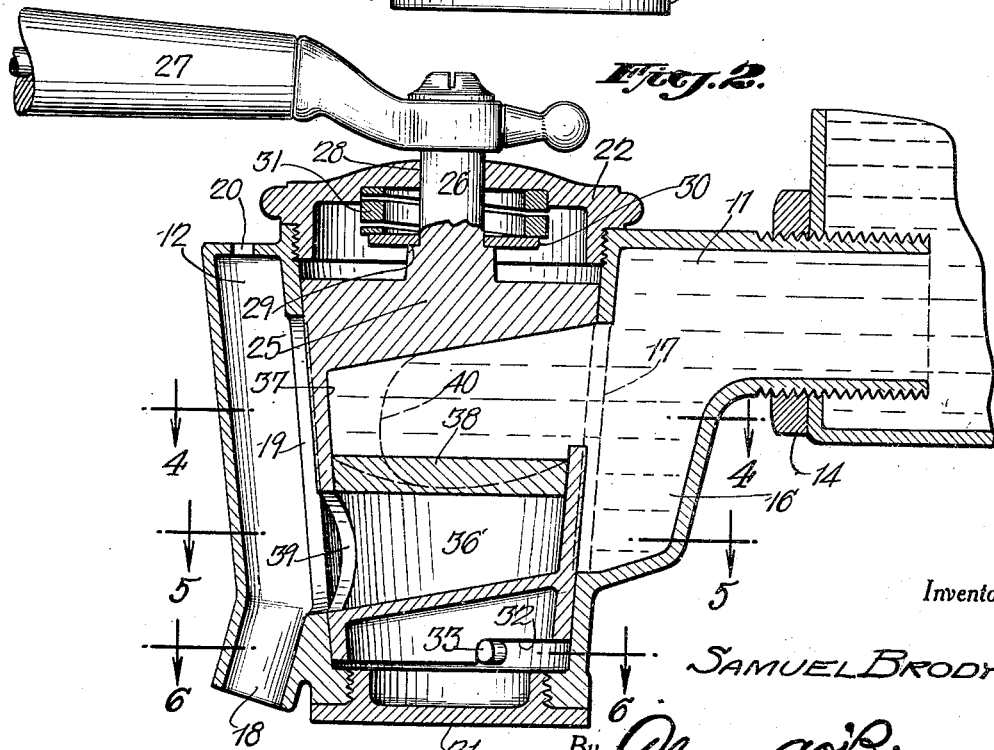

With the above and other objects in view, reference will be had to the accompanying drawings, illustrating the invention in a preferred form, and in which, Figure 1 is a view in side elevation partly in section illustrating a faucet constructed in accordance with the present invention, Figure 2 is a vertical sectional view thereof, Figure 3 is a a top plan view thereof, Figure 4 is a horizontal sectional view taken on the line 4—4 of Figure 2, Figure 5 is a horizontal sectional view taken on the line 5—5 of Figure 2, Figure 6 is a horizontal sectional view taken on the line 6—6 of Figure 2, and;

Figure 7 is a detail view partly in elevation and partly in section of a portion of the faucet.

Referring again to the drawings, a faucet constructed in accordance with the present invention provides a casing 10 having an inlet chamber 11 and an outlet chamber 12. The inlet chamber 11 has a threaded extension 13 which may be secured in any desired manner as by a nut or the like 14 in the wall of a tank 15 which carries the fluid to be dispensed in predetermined measured quantities.

The chamber 11 has a lower portion 16, and the entire chamber communicates with the interior of the casing 10 by means of a relatively narrow slot 17. The discharge chamber 12 has a discharge spout 18, and this chamber has communication with the interior of the casing 10 by means of a relatively long narrow slot 19. The upper wall of the discharge chamber 12 is provided with a vent opening 20 to permit ready flow of the fluid from the said discharge chamber.

The casing 10 has its lower end closed by a screw cap 21 and its upper end closed by a screw cap 22. Mounted in the casing 10, there is a turning plug 25 and this turning plug 25 has an extended shank 26 which receives an operating handle 27 and which is mounted as at 28 in the screw cap 22 heretofore mentioned. The projection 26 has a shoulder 29 formed thereon and seated on the shoulder 29 there is a washer or the like 30 and interposed between the washer 30 and the screw cap 22, there is a coil spring 31 by means of which the plug 25 is maintained in position in the casing. The lower end of the plug 25 is provided with a cut out portion 32 which forms two shoulders 33 and 34, and these shoulders are adapted to engage a pin 35 carried by the housing for the purpose of limiting the rotary movement in opposite directions of the turning plug 25.

The turning plug 25 is hollow, and is divided into two chambers 36 and 37 by means of a partition or the like 38. The chamber 36 has an opening 39 therein, and the chamber 37 has an opening 40 therein, and these openings are diametrically opposed with respect to each other in order that when one opening is in registration with the outlet passage 17 of the chamber 11, the other opening will be in communication with the outlet passage 19 or in a position to discharge into the discharge chamber 12.

The partition 38 heretofore mentioned is retained in position in the turning plug by means of solder, and the size and thickness of this partition determines the quantity or volume of fluid which the chambers 36 and 37 are capable or holding. If, for example the thickness of the partition 38 is increased, the volume of the chambers will be correspondingly reduced. If at any time it is desired to vary or change the volume of the fluid handled by the chambers 36 and 37, it is only necessary to remove the partition 38 and substitute therefor a thicker partition when the volume will be reduced, or if a thinner partition is used, the volume of the chambers will be increased.

The device operates in the following manner:

With the parts in the position shown in Figure 2, the chamber 36 has discharged its contents and the chamber 37 is in communication with the upper portion of the chamber 11 and is filled with the fluid to be dispensed. Upon grasping the handle, and turning the plug 25 so that its shoulder 34 engages the pin 35, the opening 39 of the chamber 36 will be moved so as to receive fluid in the chamber 36 from the chamber 11, and the opening 40 of the chamber 37 will be moved to position where the contents of the chamber 37 will be discharged into the chamber 12. An operation in the opposite direction until the shoulder 33 engages the pin 35 will again move the parts into the position into which they are shown in Figure 2 and effect a filling of the chamber 37 and a discharge of the contents of the chamber 36.

Thus it will be apparent that merely by the operation of the handle 27, the plugs may be turned to alternately establish communication between the chambers 36 and 37 with the intake chamber 11 and the exhaust or outlet chamber 12. The spring 31 serves to maintain a tight fit between the plug 25 and the casing 10, the plug 25 and casing 10 being tapered in order to insure this result.

While the invention has been herein disclosed in a preferred form, it is to be understood that the invention is not to be limited to the specific construction herein illustrated, and that it may be carried out in other forms without departing from the spirit thereof.

Having thus described the invention, what I claim as new and desire to secure by Letters Patent is:—

1. A measuring faucet comprising a casing, an inlet pipe for said casing, said inlet pipe having a relatively long chamber, said chamber having communication with said casing by means of an elongated slot extending substantially throughout the entire length thereof, an outlet spout having a relatively long chamber having communication with the interior of said chamber through a relatively long slot, and a turning plug rotatably mounted in said casing and having superimposed chambers which may alternately be placed in communication with the inlet and outlet of the casing.

2. In a measuring faucet, a casing, an integral projection on one side of said casing and forming an inlet chamber, a second integral projection diametrically disposed with respect to said first mentioned projection and constituting an outlet chamber, and turning plug having superimposed chambers mounted in the casing and so arranged that its chambers may alternately be brought into registration with the inlet and outlet chambers.

3. In a measuring faucet, a casing, or housing, a hollow turning plug mounted in said casing, and a partition dividing said turning plug into two superimposed chambers, said partition being removable to permit of its replacement by another plug to alter the capacity of the chambers of the turning plug.

In testimony whereof I affix my signature.

SAMUEL BRODY.